Patented Sept. 22, 1942

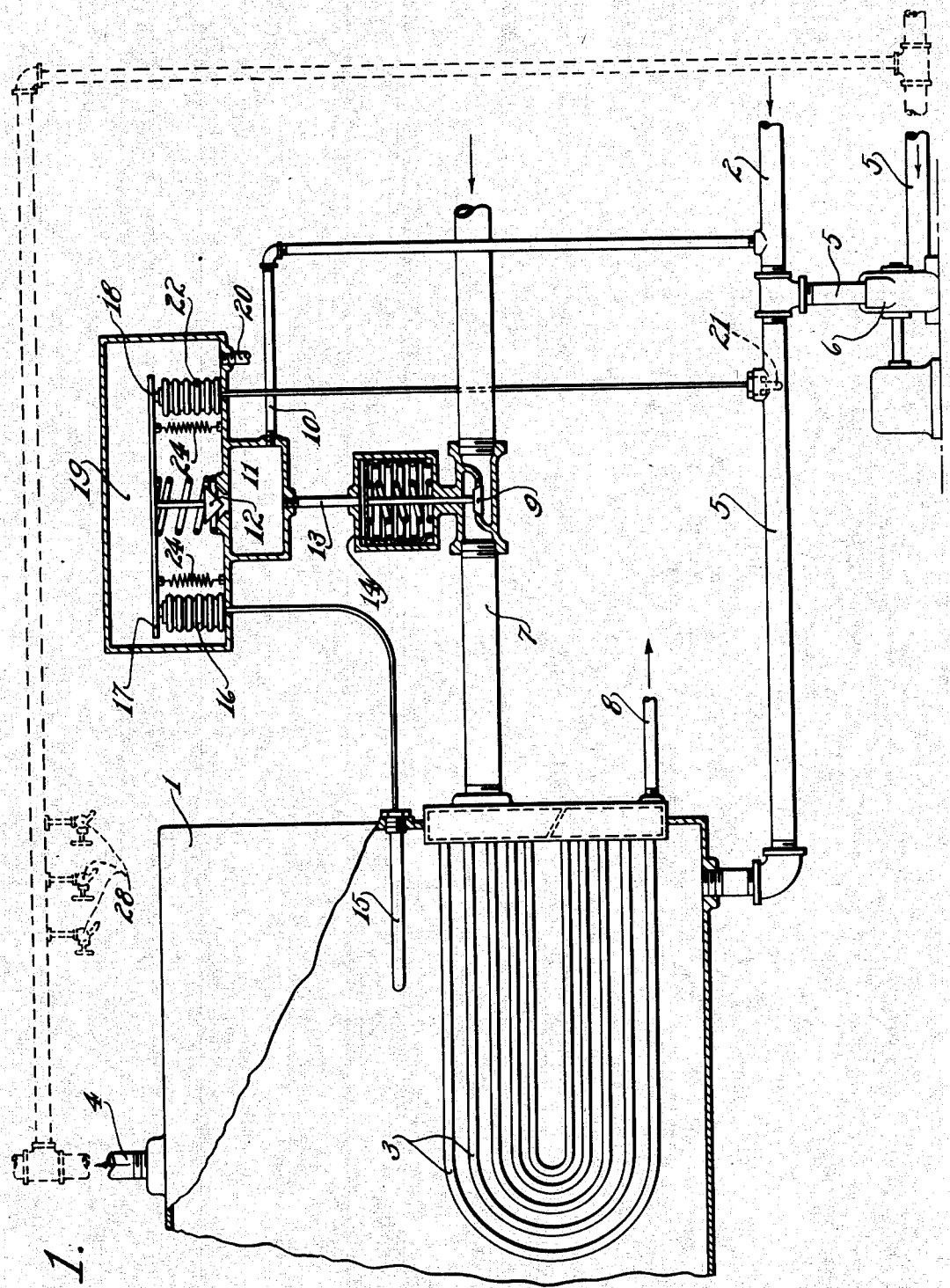

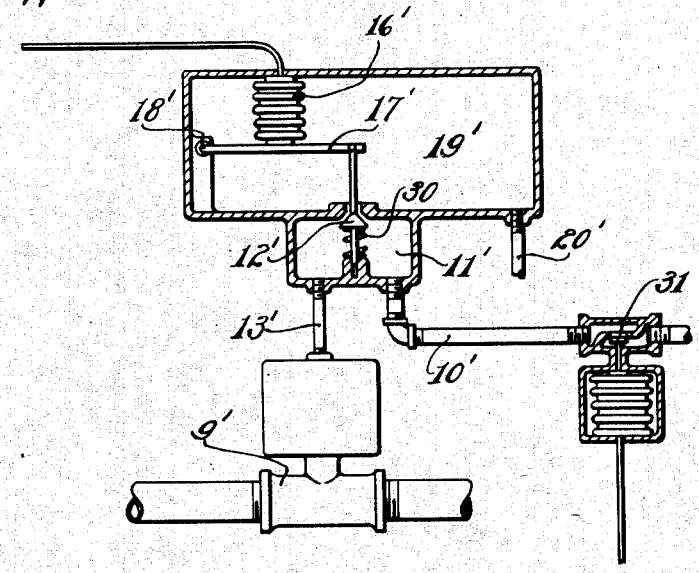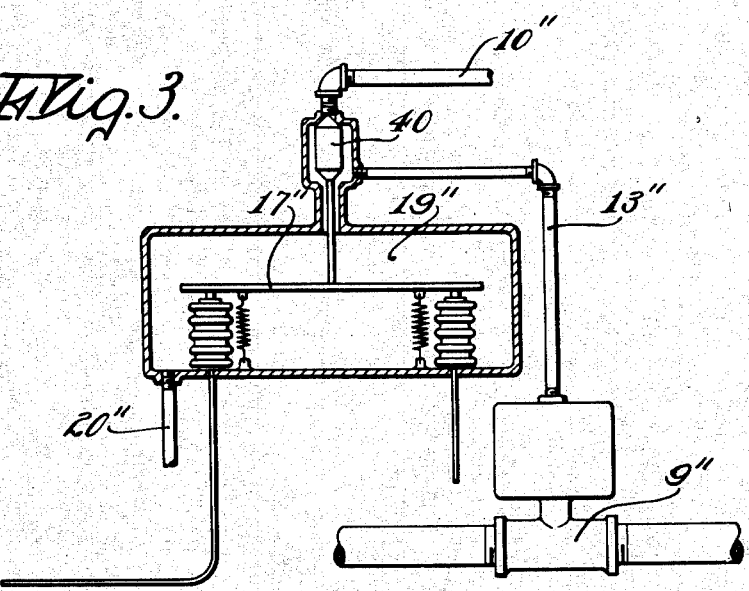

2,296,325

UNITED STATES PATENT OFFICE 2,296,325

CONTROL FOR HOT WATER HEATERS

Alexander Bak, Northampton, Mass.

Application February 27, 1941, Serial No. 380,936

4 Claims. (Cl. 236—18)

This invention relates to hot water heating systems and means for maintaining the water contained therein at a uniform temperature. It has particular reference to the regulation of the heating means for the system in relation to the flow of water through the system and the arrangement of control elements in a new combination for actuating said heating means.

The arrangement as disclosed in the drawings accompanying the description has for purposes of illustration special reference to that type of system in which one tank is used for both heating and storage.

Systems of the type shown having one large tank for both purposes are most usually found where relatively large quantities of hot water must be ready for use at any time. They are commonly used in hotels or institutions where the demand for hot water is frequent and heavy at various times. This creates a problem of eliminating any possibility of water insufficiently heated escaping into that part of the system from which it is expected hot water will be withdrawn for use.

Various methods of eliminating this possibility have been proposed but so far as I am aware, the problem has not been met by the simple arrangement which forms the basis for the present disclosure. This arrangement is characterized chiefly by the location in the system of a thermostatic element which actuates the heating means whenever cold water is supplied to the storage tank to compensate for hot water taken out of the system.

The advantages of my new arrangement and its increased efficiency over prior art apparatus will be more apparent from a description of the system in connection with the accompanying drawings, in which Fig. 1 is a diagrammatic view of the system embodying my invention;

Fig. 2 is another form of actuating mechanism for regulating the heating means; and Fig. 3 is a modification of the controller valve mechanism of Fig. 1.

Briefly, prior art functions of the apparatus shown in Fig. 1 are as follows: The heating and storage tank 1 is supplied with cold water by a pipe 2 leading from a suitable source of supply such as a city water main. Water in tank 1 is heated by heating coils 3 usually disposed, as shown, in the lower part of the tank. Hot water is discharged from the tank through pipe 4 leading to suitable outlets as at 28 at various points throughout the building or buildings supplied by the system. A water return line 5 leading back from the pipe system having the hot water outlets maintains the circulation of heated water in the system by means of a motor driven pump 6 in line 5. Line 5 joins supply pipe 2 conducting the water in the return back into the lower part of tank 1. When no water is being drawn off from the system, no water will enter the system from pipe 2.

Heat for coils 3 is supplied by steam under pressure coming through steam line 7. A heater-drip or steam return line 8 is for circulation of steam heat in the system. A bellows operated steam valve 9 in line 7 is for automatic regulation of the heat supply to coils 3.

The controller mechanism for valve 9 as it has been operated heretofore will be seen by considering Fig. 1. A pressure line 10 connecting from the cold water supply source carries water under pressure into a chamber 11. Chamber 11 has a relief valve 12 normally held closed against the passage of water therethrough by tension springs 24 drawing arm 17 down on the stem of valve 12. When the valve is closed water is unable to pass through it and is conducted through a pipe 13, where being under pressure it depresses bellows 14 to open valve 9 and thus admits steam to the coils 3.

In order to shut down the steam supply by seating valve 9, a thermostatic element 15 in tank 1 located in the body of water above the heating coils is connected with the controller device. It operates in this way: As the heat of the water in tank 1 rises to a predetermined temperature thermostat 15 causes operation of a bellows 16 to lift the lever arm 17, thereby raising valve 12 from its seat. When valve 12 is opened the pressure in pipe 10 is transmitted through the opening of said valve into chamber 19 where it is dissipated through an exhaust discharge pipe 20 leading to a sewer connection. The exhaust passageway for the pressure line releases the pressure on bellows 14 and allows steam valve 9 to be seated. The steam supply is thereby cut off and will not be admitted to coils 3 until the element 15 operating by contact with colder water results in closing valve 12 and opening valve 9. The single control of the prior art will be more readily understood from the drawing by considering that arm 17 might be resting on a fixed fulcrum at the point marked 18 instead of, as shown, on the top of an expanding bellows.

In the prior art apparatus, operating as described above, water drawn out of the system will be displaced by cold water flowing from pipe 2 into pipe 5 and tank 1. If the element 15 at such time has caused expansion of bellows 16, enough to have shut off the steam supply for some time, coils 3 may or may not have sufficient heat remaining in them to raise the temperature of this colder water from the cold water feed pipe 2. The amount of hot water drawn off of course determines the amount of cold water entering through pipe 2 and this mixes with the hot water circulating through return pipe 5. It will be seen that under circumstances of a heavy withdrawal of hot water from the system a relatively cool mixture may enter the tank and rise above the heating coils 3 before surrounding element 15 to again cause steam to enter the coils. Thus where the demand for hot water is such as to pass a lot of feed water by the heating coils there is a possibility that layers of cold water will escape into the discharge pipe 4 and be drawn off instead of the hot water desired. The flow of water in tank 1 is generally in an upward direction because of the action of pump 6 in line 5 circulating the water in the system.

To eliminate the possibility of cold water passing into the hot water pipes in this way I have provided as shown in Fig. 1 a second thermostatic element adapted to actuate the heating means whenever a supply of cold water enters the system to compensate for hot water drawn off. In Fig. 1 my second thermostatic element 21 is located in pipe 5 immediately after the junction of pipe 2 and pipe 5. This element 21 is connected through a bellows 22 to the opposite end of the lever arm 17. Instead of there being a fixed fulcrum at 18 this end of the arm 17 responds to the changes in temperature of element 21. It raises and lowers valve 12 in the same manner as element 15 controls the same.

With the two thermostatic elements 15 and 21 tending to govern valve 12 independently it will be seen that whenever either one or the other is cool valve 12 cannot be completely open. Only when both ends of lever arm 17 are raised by the expanding reaction of both elements, 15 and 21, will valve 12 open completely and entirely shut off the steam supply through valve 9. The reaction to cool water of element 21 alone will, through partial operation of valve 12, cause pressure in pipe 13 sufficient to partially open valve 9 and admit steam to the coils. Thus a cooler mixture of water entering the bottom of the tank will have already caused opening of valve 9 and will pass against coils 3 while being heated sufficiently to bring such water to the desired temperature. Cold water entering the system therefore cannot escape past the heating coils when they are insufficiently heated as it does in the prior art arrangements.

The thermostatic element 15 as well as operating at various times to increase the supply of steam to heat the water also acts with element 21 to prevent water from becoming excessively hot. By adjusting the two elements and the control valve 12 a proper balance can be maintained for keeping a uniform temperature throughout the system. Assuming that element 21 has caused a supply of steam to enter the coils and that the water then surrounding the coils is already at the desired temperature a further slight increase in the temperature of that water will cause element 15 to expand bellows 16 to a greater degree and reduce by regulating valve 12 the steam supply to that amount of heat which will be adequate to raise to a proper degree the cooler mixture of water being introduced.

I am aware that various double thermostatic controls for heating water have been devised to achieve a uniform temperature in the storage tank, but so far as I know, the present disclosure is the first to relate one of the controls for the heating means to the introduction of cold water supply necessary to displace water taken out of the system. The increase in efficiency of the heating means by being directly related to the introduction of cold water supply results in a greater uniformity of temperature throughout the system at all times and effectively prevents the release of cold layers of water into the discharge side of the tank.

While I have shown a steam heating system it will be understood that my invention may be adapted to many other types of systems in which other fuels and heating means are employed. To the man skilled in the art it will be a matter of applying the appropriate mechanisms for the particular apparatus, once my disclosure is made known to him.

It will also be understood that various other types of controlling means can be utilized to respond to the changes in the temperature of the water in the system described. I have shown diagrammatically one such other type of control apparatus in the drawing of Fig. 2. This illustrates the general structure of a heating control well known in the trade as a "Powers No. 10" regulator. My invention has been adapted to it. Numerals designating elements corresponding to those of Fig. 1 have been primed.

This regulator operates as follows: Water under pressure from the city main in pipe 10' enters chamber 11'. Relief valve 12' for the chamber is normally urged to closed position by a compression spring 30. When it is closed, water enters pipe 13' operating steam valve 9' to open and admit steam to the coils. The valve 12' is actuated through arm 17' which is in this structure pivoted at 18'. The thermostatic element in the tank connected through bellows 16' to arm 17' is set, when heated to the desired temperature, to push the arm 17' against the valve stem of valve 12'. Thus it forces valve 12' off its seat. Water pressure from line 10' is then reduced by passage through valve 12' to chamber 19' and out to the sewer through pipe 20'. The second thermostatic element is placed in pipe 5 as in Fig. 1 but is connected in this apparatus to a bellows operated valve 31 in line 10'. Valve 31, as shown, is normally held in partially open position to allow passage of a certain amount of water at all times. When cold water strikes the thermostatic element located in the return line as in Fig. 1, valve 31 is opened more widely to create a greater pressure in chamber 11'. It is more pressure than can be dissipated out through valve 12' and this excess is enough to operate the bellows of valve 9', thereby maintaining the steam supply line open to compensate for the introduction of cold water into the system. Valve 31 is not closed entirely at any time, since the passage of a given amount of water in pipe 10' will always find an outlet through valve 12' when the water in the system is thoroughly heated.

In Fig. 3 there is illustrated a modification of the control valve mechanism similar to the mechanism of Fig. 1. This arrangement is designed to cut down the amount of water used in the pressure pipe lines by eliminating the waste of a continuous flow of water to the sewer outlet during the time the steam supply is cut off.

When it is necessary to open steam valve 9" a two-way valve 40 is drawn downward by lever arm 17" through a contracting reaction by either of the two thermostatic elements placed as in Fig. 1. The lower position of valve 40 permits pressure in line 10" to flow into pipe 13" and operate the bellows of the steam valve. When valve 40 is urged to its uppermost position by the expansion caused by the two thermostatic elements the pressure in line 13" will be released through chamber 19" and sewer connection 20". Valve 40 in this position cuts off flow of water from pipe 10". Thus while the heat supply is cut off, the continual flow of water to the sewer outlet as described in Fig. 1 is prevented.

I claim:

1. An apparatus for furnishing hot water at any one or more of a number of faucets and in either small or large volumes depending on the use of such faucets over a given period of time, such apparatus comprising in combination, a storage tank, a pipe line connected to the tank providing for a circulation from and to the tank in a closed cycle, take-off hot water faucets in said line, water heating means in the lower part of the tank, a thermostat with its heat-sensitive element located to respond to the temperature of the water in the upper part of the tank and its control element adapted to turn the heat off when the water controlling said sensitive element is hot enough, a water circulating means adapted to pass the water in a closed cycle from the upper part of the tank through said pipe line and to the lower part of the tank, automatic means to replenish the apparatus with unheated water in the same volume that hot water is withdrawn at the faucets, said unheated water being let in to the closed cycle in the return portion of the pipe line to avoid the faucets and enter the storage tank at the bottom, and a second thermostat having its heat sensitive element located to be critically responsive to said admission of unheated water and its control element adapted to turn on the heating means whenever a substantial amount of hot water is drawn from the faucets and cold water is admitted to the pipe line of the closed cycle, said second thermostat at all other times being inoperative, thus permitting the apparatus to operate under the sole control of said first thermostat when the hot water take-off faucets are not being used to a substantial extent and under the control of the second thermostat when the faucets are being so used.

2. A double thermostatic control for a hot water heating system having a storage tank with heating means and a heating conduit therefor, a return line heading back to the tank for circulation of water in the system, and a supply pipe joined to said return pipe to automatically displace water drawn out of the system, said control comprising thermostatic elements, one in the tank and one in the return line after its connection with the supply pipe, a control device having connections with each element, a bellows-operated valve in said heating conduit, and a pressure line between said device and valve, normally urging said valve to open position, said device having a two-way valve actuated by the thermostatic elements, said valve when urged in one direction tending to cut off the source of pressure to the pressure line and when urged in the other direction maintaining said pressure in the line on said bellows-operated valve to open the same.

3. A double thermostatic control for a hot water heating system having a storage tank with heating means therein, a return line leading back to the tank for circulating water in the system, and a supply pipe joining said return line to automatically displace water drawn out of the system, said control comprising in combination a thermostatic element in the tank, a pressure-operated heating control device connected therewith and operable to actuate said heating means when the temperature of the element falls below a predetermined level, a second thermostatic element in the return line after its junction with said supply pipe, and a valve connected therewith in advance of said pressure control device and adapted when said second thermostat falls below a predetermined level to increase the pressure to said device and operate the heating means irrespective of the temperature of the first thermostatic element.

4. A double thermostatic control for a hot water heating system having a storage tank with heating means and heating conduit therefor, a return line leading back to the tank for circulation of water in the system, and a supply pipe joined to said return pipe to automatically displace water drawn out of the system, said control comprising thermostatic elements one in the tank and one in the return line after its connection with the supply pipe, a control device having connections with both said elements, a bellows-operated valve in said heating conduit and a pressure line between said device and valve, normally urging said valve to open position, said device having a relief valve in the pressure line, which relief valve is actuatable by either thermostatic element to reduce pressure and regulate the flow of heat through said heat conduit.

ALEXANDER BAK.